Dec. 19, 1939.  J. L. JONES  2,184,157

AREA MEASURING MACHINE

Filed Nov. 27, 1934  7 Sheets-Sheet 1

Dec. 19, 1939.   J. L. JONES   2,184,157
AREA MEASURING MACHINE
Filed Nov. 27, 1934   7 Sheets-Sheet 2

INVENTOR
John L. Jones,
BY
their ATTORNEY.

Dec. 19, 1939.   J. L. JONES   2,184,157
AREA MEASURING MACHINE
Filed Nov. 27, 1934   7 Sheets-Sheet 3

INVENTOR
John L. Jones,
BY J. H. McCready,
their ATTORNEY.

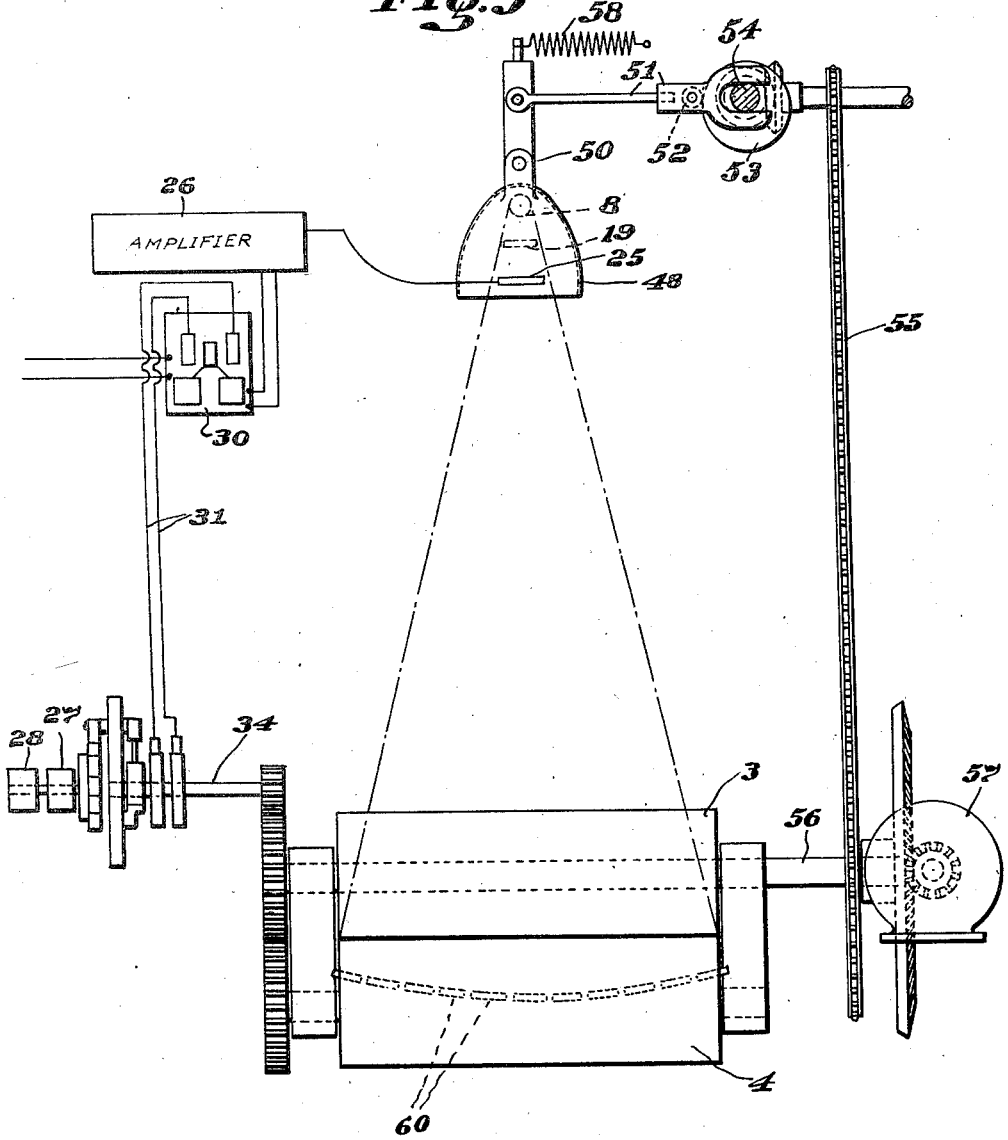

Dec. 19, 1939.      J. L. JONES      2,184,157
AREA MEASURING MACHINE
Filed Nov. 27, 1934      7 Sheets-Sheet 5
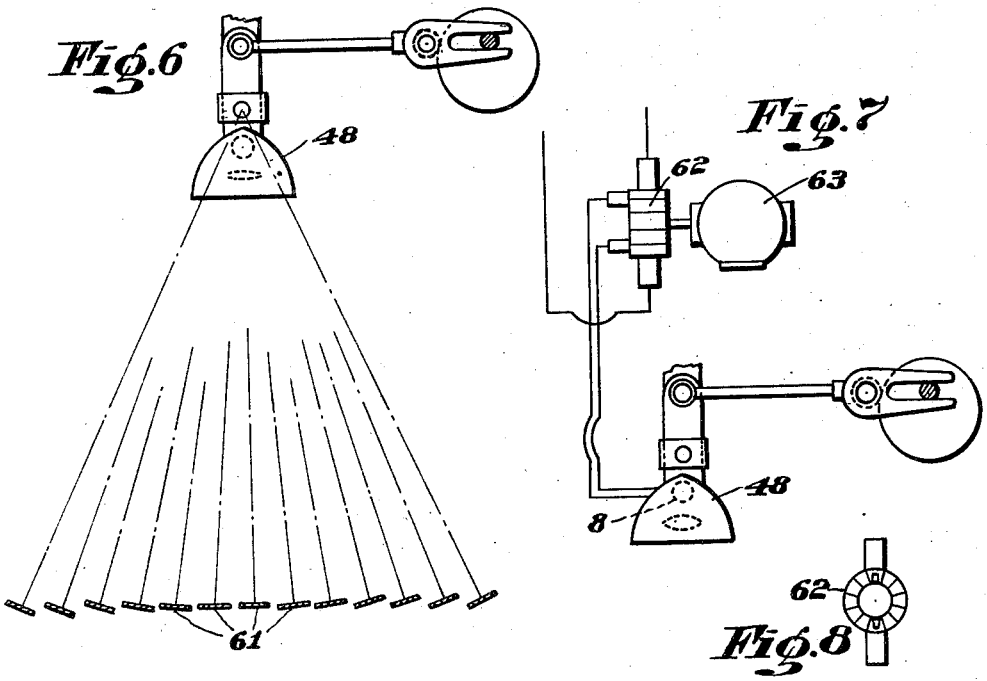
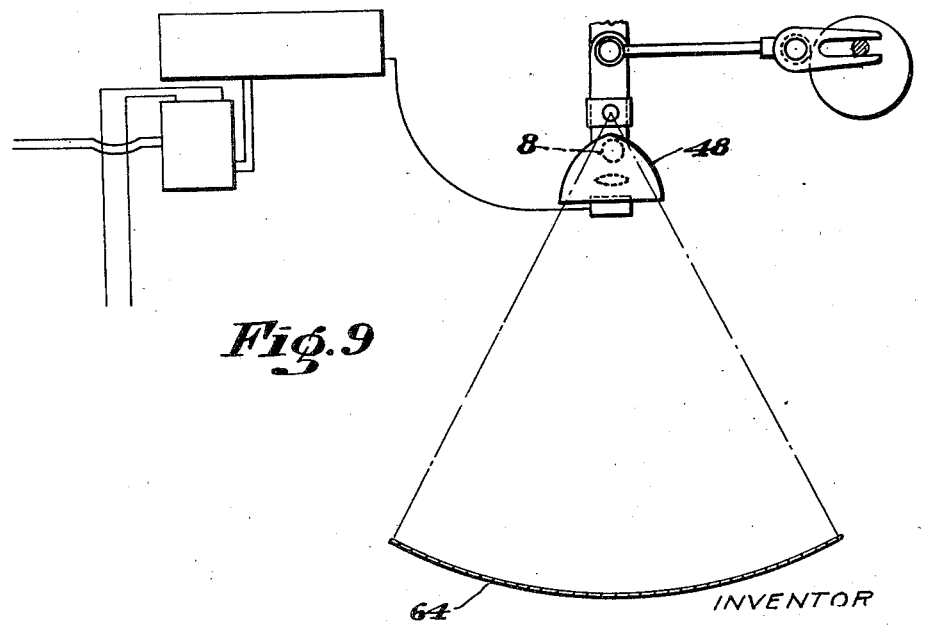

Dec. 19, 1939.                J. L. JONES                2,184,157
                        AREA MEASURING MACHINE
                        Filed Nov. 27, 1934        7 Sheets-Sheet 6

INVENTOR
John L. Jones,
BY
ATTORNEY

Dec. 19, 1939.   J. L. JONES   2,184,157
AREA MEASURING MACHINE
Filed Nov. 27, 1934   7 Sheets-Sheet 7
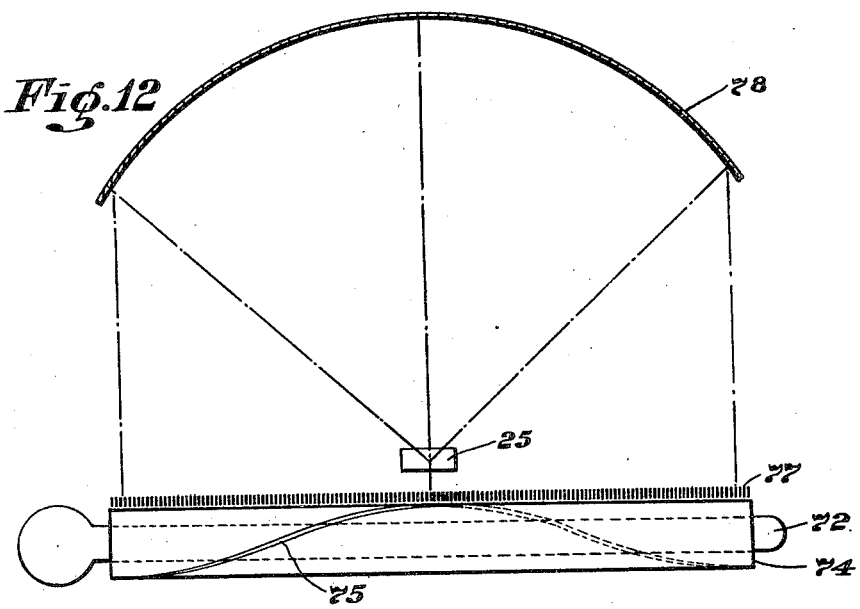
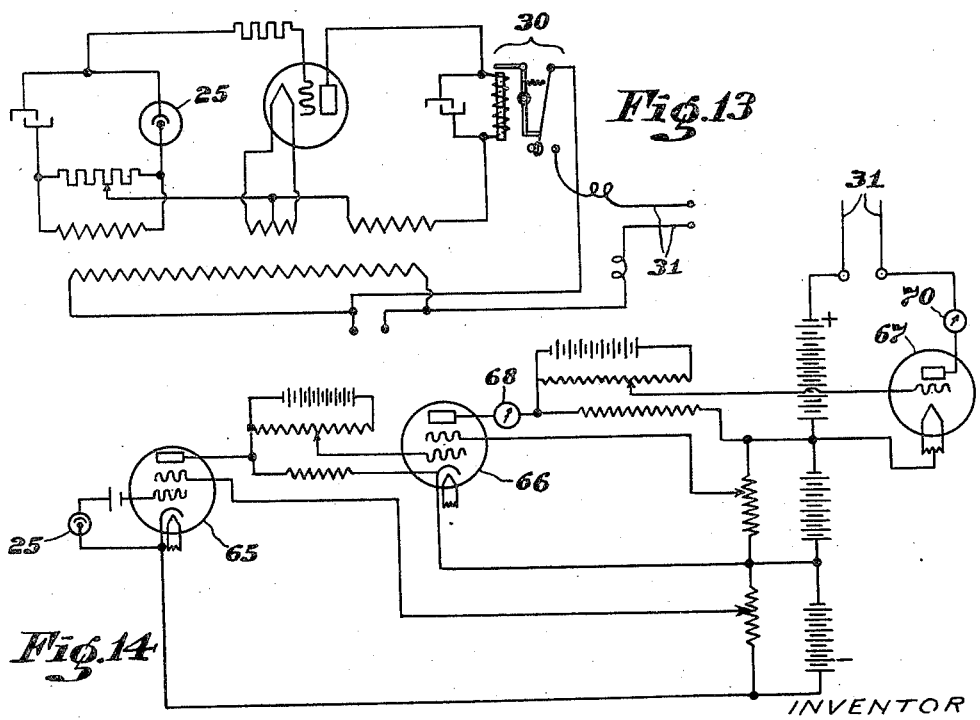
INVENTOR
John L. Jones
BY
ATTORNEY Patented Dec. 19, 1939

2,184,157

UNITED STATES PATENT OFFICE 2,184,157

AREA MEASURING MACHINE

John L. Jones, Billerica, Mass., assignor to Stockton Profile Gauge Corporation, Lowell, Mass., a corporation of Massachusetts Application November 27, 1934, Serial No. 755,002

9 Claims. (Cl. 33—123)

This invention relates to methods of and apparatus for measuring the areas of surfaces, more especially those having irregular outlines and which, therefore, are difficult to measure accurately.

Such methods and apparatus find an important commercial use in measuring the area of hides or leather, but they are also useful for a considerable variety of other purposes. The demand for them in measuring leather arises from the fact that a high proportion of the leather used in industry is bought or sold on a footage basis. This applies particularly to the leather used in the manufacture of gloves, shoes, luggage, and various other products. Consequently, machines for performing such measuring operations are widely used in tanneries, shoe factories, and, in general, by the larger users of leather.

Important objections to the present commercial machines of this character are their high first cost and the fact that most of them, at least, involve a rather high labor expense in connection with their operation. The present invention is especially concerned with these factors and it aims particularly to overcome the objections just mentioned.

In addition, the invention is directed to the improvement of machines and methods of this general character with a view to enabling these area measurements to be made expeditiously on a wider variety of surfaces and with greater accuracy than has been possible heretofore, so that such methods can be used not only for commercial purposes but also in those scientific investigations in which the results of an experiment, test, or computation is a surface having an irregular outline, the area of which must be determined with a high degree of accuracy.

The nature of the invention will be readily understood from the following description when read in connection with the accompanying drawings, and the novel features will be particularly pointed out in the appended claims.

In the drawings,

Fig. 5 is a view similar to Fig. 1 illustrating a somewhat different embodiment of the invention;

Figs. 6 and 7 are diagrammatic views illustrating modifications;

Fig. 8 is an end view of part of the apparatus illustrated in Fig. 7;

Fig. 9 is a diagrammatic view of still another modification;

Figs. 10 and 11 are partial side and sectional views, respectively, of another embodiment of the invention, parts shown in the latter figure being omitted from the former;

Fig. 12 is a diagram of a further modification; and

Figs. 13 and 14 are circuit diagrams.

Since an important commercial use of the invention is in the measurement of leather, tanned skins, and the like, the invention is here disclosed as embodied in machines adapted more especially for this purpose. The machines illustrated are designed to practice a method which may be described briefly as involving the steps of moving a beam of light or equivalent radiation across a known area in which the surface to be measured is interposed, in such a manner as to scan equal increments of said area in predetermined intervals of time, and electrically detecting and indicating or recording the number of such increments of area which are either covered or uncovered by said surface. The method thus determines the area of said surface directly or gives information from which such determination can readily be made.

Figure 1:
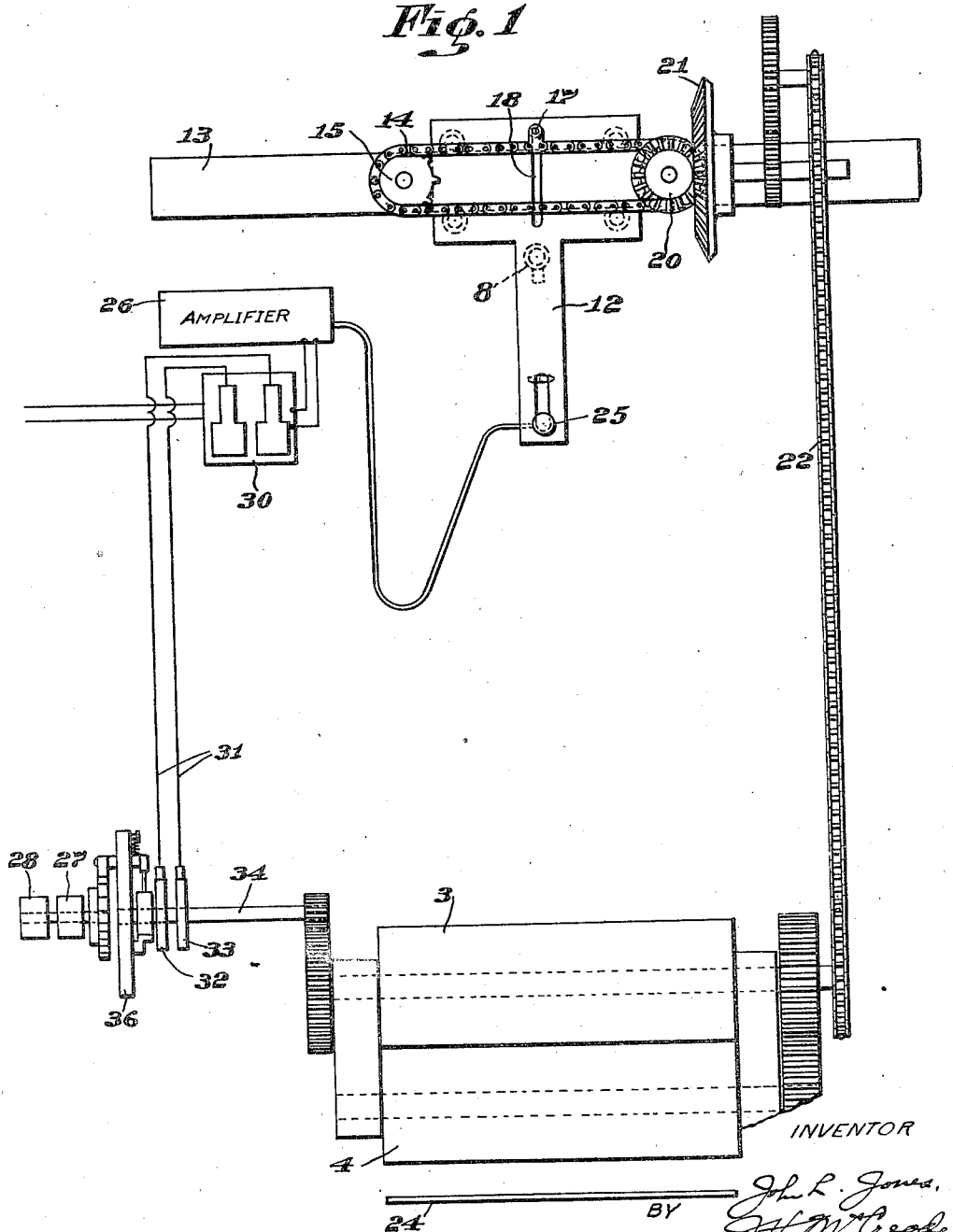
Figure 1 is a front elevation of a machine or apparatus embodying features of this invention, the illustration being largely diagrammatic.
Figure 2:
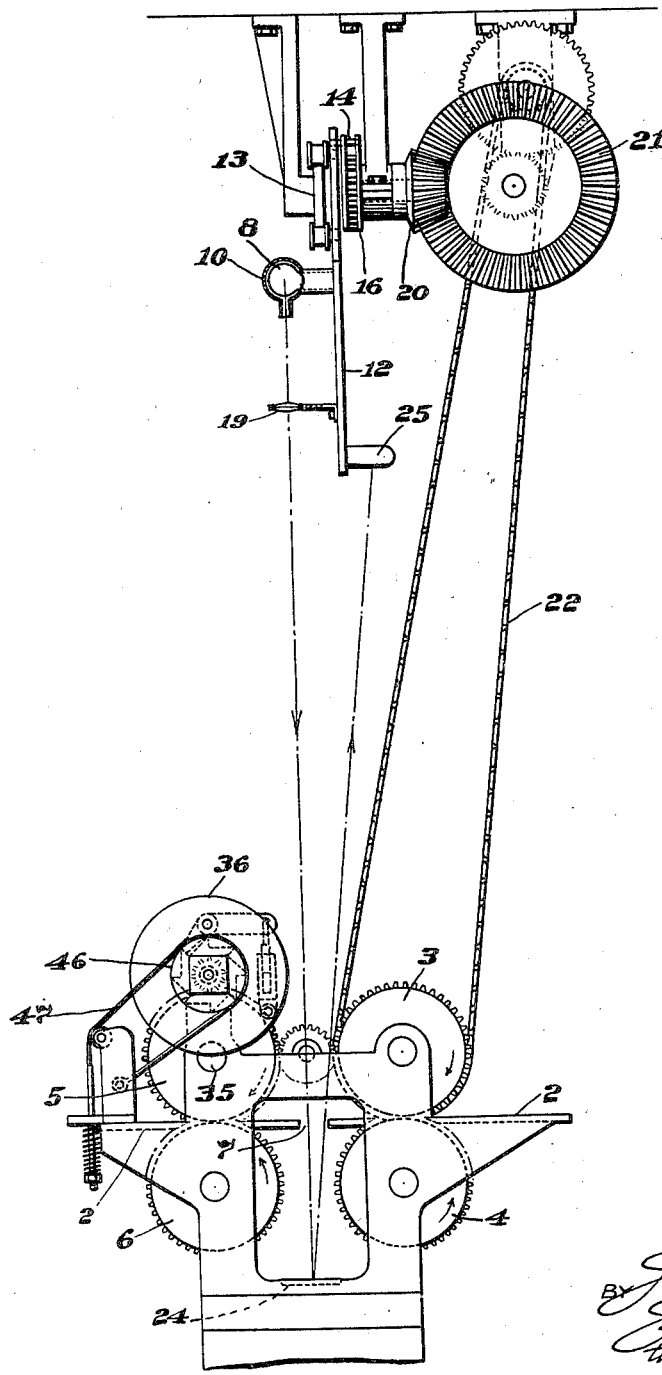
Fig. 2 is a side elevation of the machine illustrated in Fig. 1.

Referring first to Figs. 1 and 2, the machine there shown comprises a table 2 having a flat upper surface on which to support the skin or other material to be measured. Mounted in cooperative relationship to this table are upper and lower front feed rolls 3 and 4, respectively, and a similar pair of rear feed rolls 5 and 6 operable to grip a skin and feed it across the table. All of these rolls are geared together and they may be driven from any suitable source of power.

Between the two sets of feed rolls the table 2 is provided with a long narrow slot 7, Fig. 2, extending parallel to the axes of the rolls and preferably of approximately the same length as the rolls. As the skin passes across this slot it comes into the path of the scanning beam of light issuing from an electric lamp 8 which is enclosed in a hood 10 provided with the usual light tube. This lamp is mounted on a carriage or slide 12 arranged to reciprocate horizontally on a stationary track 13, the slide being provided with casters or rolls which grip the track and serve both to guide and support the slide. For the purpose of imparting the desired reciprocating motion to the slide, a chain 14 is supported immediately beside it on suitable sprocket wheels 15 and 16 and this chain carries a roll or pin 17 that projects into a vertical slot 18 in the slide. Consequently, as the chain revolves, the pin or roll 17 moves the slide or carriage 12 backward and forward on its track. A positive driving connection is provided between the chain and the feed rolls which, in the particular arrangement shown, comprises a bevel gear 20 secured fast on the shaft of a sprocket wheel 16 and driven by another bevel gear 21, the latter being driven through suitable gearing and a sprocket chain 22 from the shaft of the feed roll 3. A lens 19, Fig. 2, is mounted on the carriage in line with the light tube to assist in controlling the beam of light.

With this arrangement, therefore, a relatively thin pencil or beam of light is swept across the entire width of the skin from one side thereof to the other simultaneously with the feeding of the skin a known distance through the machine. The rate of movement of the beam and the rate of feed of the skin may be so adjusted that the entire surface of the skin, or closely spaced strips only of said surface, may be scanned, as desired. As the beam travels from one end to the other of the slot 7, it will move part of this distance before it strikes the skin, will then cross the skin, and travel the remainder of its stroke out of contact with the leather, these operations being repeated on the return stroke. It will be evident that since the rate of movement of the beam and the rate of feed of the skin are known, if the total time interval during which the beam is on the skin is found, then the area of the skin can readily be calculated. Or, since the beam reciprocates in a path of predetermined length and thus scans a known area during the feeding of the skin a given distance, if the total length of time that the beam is not intercepted by the skin is measured, then the scanned area of the skin can readily be calculated. Either of these time determinations can be made in the machine shown. That is, provision is made in this machine for integrating the time intervals during which the beam is on the surface to be measured, or off it, as desired.

For this purpose a reflector 24 is mounted in the machine immediately below the slot 7 where it serves to reflect the scanning beam on to a photo-electric tube, photo-electric cell, or other suitable light sensitive device, all of such devices being hereinafter included in the term "photo-cell". This element is indicated at 25 and, as shown in the drawings, it is mounted on the carriage 12, where it travels with the source of light 8 and thus maintains a constant relationship to it.

As the scanning beam intersects the edge of the skin in moving in either direction, it produces an abrupt change in the flow of current in the circuit in which the cell 25 is connected. However, due to the fact that the currents handled by these photo cells are relatively weak, it is necessary to amplify the cell current in order to build it up to a value suitable for operating or controlling a counter or some other type of indicating or recording apparatus. As shown in Fig. 1, the cell circuit includes an amplifier 26, the nature of which necessarily will depend upon the requirements of different types and designs of machines, the nature of the photo-cell used, and other practical considerations.

Figure 3:
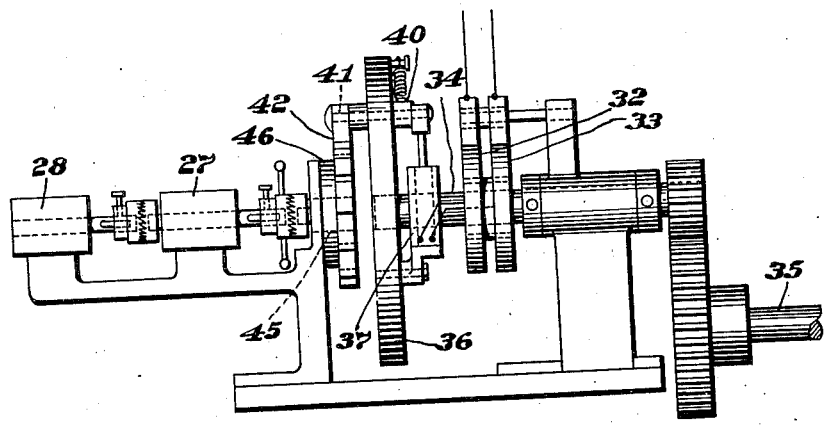
Fig. 3 is a front elevation of the controlling mechanism for the counters or indicating instrument or instruments.
Figure 4:
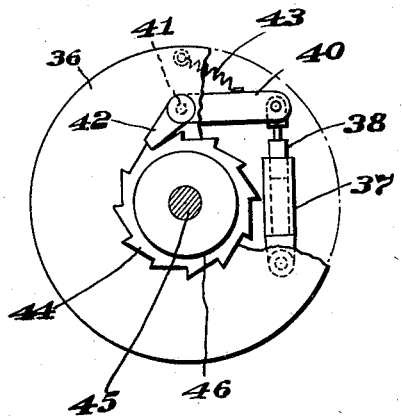
Fig. 4 is a vertical, sectional view of part of the mechanism illustrated in Fig. 3.

The output current of this amplifier controls the operation of two counters, indicated at 27 and 28, respectively, such control being effected through a relay 30 which may consist of an electro-magnetically operated switch for turning current on or off the conductors 31. Referring more especially to Figs. 3 and 4, it will be seen that these conductors run to brushes which bear on two slip rings 32 and 33, both secured fast on a shaft 34 which is geared to the shaft 35 that carries the upper rear feed roll 5. Also mounted on the shaft 34 is a disk 36, Figs. 3 and 4, carrying a solenoid 37 with which a plunger 38 is operatively associated, the latter being pivoted to the outer end of an arm 40, fast on a rock shaft 41, to which a pawl 42 also is secured. A spring 43 acts on the arm 40 in a direction tending to hold the pawl 42 in engagement with the teeth of a ratchet wheel 44 which is secured fast on another shaft 45 co-axial with the shaft 34. This arrangement forms, in effect, a magnetically controlled clutch through which a driving connection may be established between the shafts 34 and 45, when desired. The two counting devices shown conventionally at 27 and 28 may be of any suitable type, the former being designed to give the relative measure or area of a single skin and the latter to give the total indication or area of any desired number of skins, as for example, the number in a batch or order. The counter 27 is connected to the shaft 45 through a manually operable clutch, and the other counter 28 is connected to the unit 27 in a similar manner. Both may be equipped with the usual lever, button, or the like, for turning them back to zero. Secured on the shaft 45 is a brake drum 46, arranged to be engaged by some cooperating relatively stationary brake element, such as the brake band 47, Fig. 2, to stop the rotation of the countershaft 45 immediately upon the movement of the dog 42 out of engagement with the ratchet wheel 44.

When this machine is in operation and a skin is being fed through it, with the scanning beam traversing the slot 7, as above described, the action of the light on the photo-cell 25 will cause a current sufficient to actuate the relay 30 to be delivered by the amplifier so long as the scanning beam is not intercepted by the hide or skin. Assuming that the relay 30 holds current on the conductors 31 at this time, the solenoid 37 will be energized, thus holding the pawl 42 out of engagement with the ratchet wheel 44. While this condition obtains, therefore, the shaft 45 will remain stationary and neither of the counters will be operated. As soon, however, as the scanning beam strikes the skin, and it therefore is prevented from reaching the photo-cell, the current in the cell circuit will be cut down to a value so small that the relay 30 will open the circuit through the conductors 31, thus de-energizing the solenoid 37 and allowing the spring 43 to move the pawl 42 into engagement with the ratchet wheel 44. Thereupon the shaft 45 will begin to rotate with the shaft 34 which, as above stated, is positively connected with the feeding mechanism, so that at this time the counters will be driven in a constant and definite relationship to the rate of the feeding movement of the skin.

It will thus be evident that in this arrangement equal known increments of area are scanned in equal intervals of time, and consequently, each time interval represents a definite area. The instrument 27 counts, and thus collects or integrates, the increments of area or the time intervals during which the scanning beam is intercepted by the skin being measured; and it may be calibrated to give the result directly in square feet, or in some other convenient unit of square measure. If, however, the solenoid 30 is made to operate in a manner reverse to that just described, or if the spring 43 is so connected with the pawl 42 that it holds this pawl out of engagement with the ratchet wheel 44 when the solenoid 37 is de-energized, then the counter will integrate the area increments or time intervals during which the scanning beam is not intercepted by the skin. By subtracting this result from the known scanned area in which the skin is interposed, or the total time required for the beam to traverse said area, the same result will be obtained as before. In either case the counter gives a result which bears a definite relation to the area of the skin being measured, and from that result the area in square feet, or other convenient unit of square measure, can easily be determined. When the subtraction method is used, the known scanned area must obviously be large enough to include the entire skin.

It will be observed that the speed with which the counter will respond to the movement of the beam on or off the edge of the skin will depend upon the characteristics of the electrical elements, including the photo-cell, the amplifier, and the relays, and also upon the spacing of teeth on the ratchet wheel and the speed at which the disk 36 is driven. The electrical system may be made to operate practically instantaneously, and the time interval required for the pawl 42 to pick up the ratchet wheel may be made extremely short by using a large number of teeth or revolving the disk 36 at a high peripheral speed. A magnetically operated friction clutch may be substituted for the positive clutch above described and may be controlled in the same manner as the latter clutch.

The machine above described may be regarded as a typical embodiment of the invention for the specific purpose of measuring the areas of skins, leather, and other sheet materials which can be handled in essentially the same manner. It will be evident, however, that the general organization, as well as the details of construction, of such a machine necessarily will be varied in accordance with the nature of the material to be handled and other requirements of individual uses. In the particular machine shown, the beam of light is reciprocated in a fixed path and the skin is fed forward through this beam at right angles to said path. Such an organization has advantages from the standpoint of machine design, but the important consideration is the relative movement of the beam and the surface under examination, the specific means provided to produce this relative movement being less important and largely determined by the requirements of good engineering and correct machine design.

Many other embodiments of the invention, all involving essentially the same principles, may be devised. A very few only of such modifications will be described.

For example, in the machine above described the necessary speed relationship between the various elements is maintained by positive driving connections, including gearing, sprocket and chain connections, and the like. These might, however, be replaced by synchronous motors, one such motor driving the feeding mechanism, another the scanning apparatus, and a third the counting units, and the latter drive could be controlled through the magnetic clutch arrangements above described.

In some cases it is preferable to mount the source of light used, such as the incandescent lamp 8, so that it will swing instead of reciprocate in a straight line, as in the machine above described. This is particularly true where higher scanning speeds are required than could be obtained in the latter arrangement. Such constructions are shown in Figs. 5, 6, 7 and 9. Referring first to Fig. 5, it will be seen that the electric lamp 8 and the lens 19 are mounted in a protective support or hood 48, fulcrumed at 50, the hood being provided with an extension to which a cam follower 51 is pivoted. A roll 52, carried by the follower, runs on the surface of a cam 53 mounted on a shaft 54, the cam being designed to give the beam a uniform rate of linear travel across the table. This shaft is driven through suitable gear connections and a sprocket chain 55 from a shaft 56 which supports and drives the upper front feed roll 3. An electric motor 57 drives the shaft 56 through suitable bevel gearing and also drives the shaft 34 for the counting mechanism through a gear train at the left side of the machine. A spring 58, connected to the extension from the hood 48, holds the roll 52 constantly against the periphery of the cam 53.

With this arrangement the scanning beam may be traversed across the skin or other surface being measured at a high speed while operating smoothly. By mounting the photo-cell 25 on the hood 48, it is maintained in a constant relationship to the lamp 8 where it is always normal to the beam reflected to it by the mirror 60. In other respects this arrangement is like that shown in Figs. 1 to 4, inclusive.

The nature of the amplifier used, as in the case of the other features of the design, will necessarily depend upon the requirements of individual situations. It may be of either the alternating current or direct current type. A typical amplifier circuit of the former type, suitable for those machines in which high speeds are not required, is illustrated in Fig. 13. Its operation will be readily understood, without explanation, by those familiar with apparatus of this character. In using this type of amplifier some arrangement is provided to produce rapid variations in the intensity of the beam reflected to the photo-cell in order to create the current pulsations in the cell circuit required to operate an amplifier of this character. These interruptions or fluctuations in the beam may be produced by the use of a sectional mirror, as shown at 60 in Fig. 5 and at 61 in Fig. 6. Or, this result may be effected by using a make and break device of some suitable character in the circuit of the lamp 8. Such an arrangement is shown in Figs. 7 and 8 where a circuit interrupter 62, consisting essentially of a commutator by a motor 63, is interposed in the circuit of the lamp 8 and creates flashes or marked variations in intensity of the light emitted by the lamp, the number of flashes per second being controlled by the design of the commutator and the speed at which it is operated. Arrangements of the type used heretofore in stroboscopes are suitable for this purpose. If the speeds required are high the incandescent lamp, which ordinarily is used, should be replaced by some of the other sources of light such, for example, as the neon lamp, which will give sharper flashes than will an incandescent lamp. Essentially the same effect can also be produced with a light chopper arranged to cut the beam between its source and the surface being measured. With these arrangements the continuous mirror 64, Fig. 9, can be used.

When high speeds are necessary, however, these circuits require the use of photo-electric tubes, as distinguished from photo-voltaic cells, the best example of which, at present, is the commercial Photronic cell. While the former can be used with entire satisfaction, the latter have the advantage of being rugged and reliable, less temperamental, and therefore btter suited to the requirements of those machines which must be operated by individuals not highly skilled in handling photo-electric apparatus. Consequently, it is often desirable to use this type of cell, together with a direct current amplifier, in such arrangements as those illustrated in Figs. 1 and 9. Amplifiers suitable for this purpose are known but they are not common, and therefore a suitable circuit for use here is illustrated in Fig. 14. The nature and operation of this amplifier will be readily understood from the diagram. A Photronic cell is shown at 25, the first stage tube at 65, the second stage tube at 66, and the power tube at 67. Milliammeters are included in the circuit at 68 and 70 for convenience in controlling the amplifier. The output terminals are connected by the conductors 31—31 to the slip rings of the magnetic clutch, as in the arrangement illustrated in Figs. 1 to 4. This organization has the advantage of being relatively simple, easy to handle, extremely fast, and, when properly handled, not liable to get out of order.

A further embodiment of the invention is illustrated in Figs. 10 and 11. The chief difference between this machine and that shown in Figs. 1 and 2 is that the lamp 72 is of the tubular type and may consist of a mercury arc lamp, a neon lamp, or any other form adapted to extend across the entire width of the surface to be measured. The photo-cell 73 also is of a tubular form and may be of the type developed for use in television systems. Or, instead, a composite Photronic cell can be used at this point. That is, a cell consisting of a series of Photronic cells each of square or rectangular shape, arranged edge to edge to form a long multi-unit strip, the various units being connected in parallel. The cell 73 is located in a slot or socket 76 in the table between the two sets of feed rolls. Encircling the lamp 72 is an opaque rotary sleeve 74, driven by gear connections with the feed rolls, so that it revolves in a definite relationship to the feeding movement of the skin or hide, and this sleeve has a spiral slot 75 cut in it through which the light from the tube passes. Thus the sleeve acts as a revolving shutter. As it rotates, a beam of light passes through the slot 75 and travels across the width of the skin from one end to the other of the slot in the table. The cell 73 "sees" only that portion of the beam which enters the slot 76 and is not cut off or intercepted by the skin $h$. This cell may be connected with an amplifier in the manner above described in connection with Figs. 1 to 5, and made to operate or control an integrating or indicating mechanism of any suitable character.

In order to give sharper definition at the edges of the hide, a grid 77 may be interposed between the tube and the table where it will cut off diagonal rays of light.

In the machines above described the source of light has been located above the surface to be measured, but it can, if desired, be positioned below said surface and such an arrangement is illustrated in Fig. 12. Here the tube 72, revolving shutter 74 and grid 77 are like those illustrated in Figs. 10 and 11, but the tube and the shutter are located below the grid and the path of travel of the skin is immediately above the latter. Consequently, a beam of light passing through the spiral slot 75 and travelling through the grid from one end of it to the other, is partly intercepted by the skin. That portion not so intercepted travels upwardly to the parabolic mirror 78 which reflects it to the photo-cell 25 located at the focus of the mirror. In other respects this arrangement may be like those above described. The light may be either steady or intermittent, depending upon the type of amplifier to be used with the cell.

It will be observed that in all of these arrangements the reflector (when one is used) and the source of light are on opposite sides of the surface being measured. Also, that the beam strikes the cell after passing the plane of the skin and after leaving the reflector. In this sense the photo-cell may be said to be behind both the skin and the reflector.

It may also be pointed out that the term "surface" is here used, not in its geometrical sense, but in its more common meaning in which it is regarded as having a physical existence and consequently having a thickness.

In measuring the areas of skins or other surfaces having high light reflecting properties, it is possible to omit the mirror or reflector, and to so arrange the photo-cell that it will see or receive only the rays of light reflected from the surface being measured, those rays not intercepted by the skin being absorbed by blackened or other light absorbing surfaces on which they strike, and therefore having no effect on the photo-cell. Such an arrangement is of particular utility in measuring the area of a portion or portions of a surface contrasting in color with other portions, as for example, certain areas on a photographic plate or on a chart. The occasion for making such measurement frequently arises in connection with experimental and research work. The machine illustrated in Figs. 1 and 2 may be made to operate in this manner, the beam of light being reflected from the surface being measured to the photo-cell 25 and the mirror or reflector 24 being covered with black cloth or paper to prevent the beam from reaching it. A slight adjustment of the photo-cell or the beam may be necessary in order to use the machine in this manner.

It may here be pointed out that photo-cells are essentially electrical radiation detectors. Their value in apparatus of this character depends primarily on the fact that they release electrons under the action of such radiations as visible light, infra red and ultra violet rays, and therefore may be made to produce abrupt changes in the flow of current in an electric circuit. Other forms of such detectors are known in addition to those specifically mentioned above, such for example, as bolometers and radiation thermo-electric devices. Those radiation detectors suitable for use in methods or machines embodying this invention, are herein included in the term "photocells." Also, since all three forms of radiation just mentioned can be used in these machines, they are here included in the term "light."

In the machines above described the surface to be measured is fed continuously while the scanning beam moves across it. Consequently, if the path of travel of the central ray of the beam were traced on the scanned area it would be a zig-zag line. For leather measuring such an arrangement is entirely satisfactory if the rate of feed of the skin is not too fast in relation to the scanning speed. But the very slight error introduced in this manner can be eliminated by holding the skin stationary while the beam sweeps across it in one direction, feeding it a distance equal to the width of the beam, then moving the beam backward to the opposite limit of its stroke and feeding again, these operations being repeated until the entire surface has been scanned. The same result also may be obtained by swinging the table and feeding mechanism at the end of each stroke of the beam so that the same path of travel of the beam across the scanned area will be produced as in the intermittent feeding arrangement just described.

It is contemplated, also, that the magnetic clutch above described may be replaced by a self-starting synchronous motor for driving the counter or other indicating or recording instrument, the motor itself being under the control of the relay 30. A motor of the type used in clocks is suitable for this purpose.

An important advantage of this machine as compared with the prior art leather measuring machines, is that it will measure sole leather as well as upper leather. So far as we have been able to learn, none of the prior art leather measuring machines are adapted to handle sole leather, and this is one of the reasons that leather of this kind is always sold on a weight basis, as distinguished from an area basis. Since the purchaser is more interested in area than in weight, he would prefer to buy his leather on the latter basis if he had a satisfactory way of determining the area. It will be evident, however, that the invention is not limited in its usefulness to leather measuring, but that it can also be used for a great variety of other purposes.

While typical embodiments of the invention have been herein illustrated and described, it will be evident from the foregoing that such illustration and description have been made rather by way of explanation than limitation, and that the invention may be embodied in a great variety of other forms without departing from the spirit or scope thereof.

Having thus described my invention, what I desire to claim as new is:

1. That improvement in methods of measuring the area of a surface, which consists in sweeping a beam of light across equal increments of a known area in equal intervals of time, said surface being interposed in said area, causing the interception of said beam by the edges of said surface to produce changes in the current flow in an electric circuit, moving said surface across the path of said beam at a predetermined rate and at an angle to said path, and controlling an integrating operation by said current changes, from which operation the area of the illuminated surface can be determined.

2. That improvement in methods of measuring the area of a sheet of material, which consists in feeding said sheet predetermined distances in given intervals of time, moving a beam of light transversely to the direction of said feeding movement across said sheet to scan successive increments of said sheet in equal intervals of time, and determining the total time interval during which said beam is on the surface to be measured.

3. That improvement in methods of measuring the area of a sheet of material, which consists in moving a beam of light across the sheet at a substantially constant rate, feeding said sheet at a substantially constant rate across the path traversed by said beam and in such a manner that substantially the entire surface of the sheet will be scanned by said beam, integrating the time intervals during which the beam is intercepted by the sheet, and determining the total area of the sheet from the time total so obtained and the rate of feed of the sheet.

4. In an apparatus of the character described, the combination of means for moving a beam of light in a fixed path across a given area in which a surface to be examined may be interposed, means for feeding said surface across said path transversely thereto, a photo-cell in the path of said beam, an electric circuit in which said cell is connected, and an indicating apparatus controlled by said circuit.

5. In an apparatus of the character described, the combination of means for moving a beam of light in a fixed path across a given area in which a surface to be examined may be interposed, means for feeding said surface across said path transversely thereto, a photo-cell in the path of said beam, an electric circuit in which said cell is connected, an indicating apparatus controlled by said circuit, and driving mechanism for said feeding means and said light moving means operative to maintain a constant speed relationship between them.

6. In an apparatus of the character described, the combination of means for moving a beam of light in a fixed path across a given area in which a surface to be examined may be interposed, means for feeding said surface across said path transversely thereto, a photo-cell in the path of said beam, an electric circuit in which said cell is connected, a counting device, and driving mechanism for said device under the control of said circuit.

7. In an apparatus of the character described, the combination of means for moving a beam of light in a fixed path across a given area in which a surface to be examined may be interposed, means for feeding said surface across said path transversely thereto, a photo-cell in the path of said beam, an electric circuit in which said cell is connected, said circuit including means for amplifying the cell current, and an indicator controlled by the amplified current.

8. In an apparatus of the character described, the combination of means for moving a beam of light in a fixed path across a given area in which a surface to be examined may be interposed, means for feeding said surface across said path transversely thereto, a photo-cell in the path of said beam, an electric circuit in which said cell is connected, means for producing rapid interruptions in said beam and thereby causing its action on said cell to create pulsations in the current flowing in said circuit, said circuit including an amplifier, and indicating means controlled by the output from said circuit.

9. In an apparatus of the character described, the combination of a source of light, a support therefor, mechanism for moving said support to sweep a beam of light from said source at a constant speed along a predetermined path, a photo-cell mounted on said support, mechanism for feeding the surface to be examined at a predetermined speed through said beam transversely to said path, a reflector behind the path of travel of said surface and operative to receive said beam and to reflect it upon said cell, an electric circuit in which said cell is connected, and indicating means controlled by said circuit.

JOHN L. JONES.